United States Patent
Åkerberg et al.

(10) Patent No.: US 9,231,929 B2
(45) Date of Patent: Jan. 5, 2016

(54) METHODS AND DEVICES FOR SECURITY KEY RENEWAL IN A COMMUNICATION SYSTEM

(75) Inventors: Johan Åkerberg, Västerås (SE); Linus Thrybom, Västerås (SE)

(73) Assignee: ABB RESEARCH LTD, Zürich (CH)

( * ) Notice: Subject to any disclaimer, the term of this patent is extended or adjusted under 35 U.S.C. 154(b) by 0 days.

(21) Appl. No.: 14/414,032

(22) PCT Filed: Jul. 10, 2012

(86) PCT No.: PCT/EP2012/063453
§ 371 (c)(1),
(2), (4) Date: Jan. 9, 2015

(87) PCT Pub. No.: WO2014/008923
PCT Pub. Date: Jan. 16, 2014

(65) Prior Publication Data
US 2015/0156181 A1 Jun. 4, 2015

(51) Int. Cl.
*H04L 29/00* (2006.01)
*H04L 29/06* (2006.01)
*H04L 9/08* (2006.01)

(52) U.S. Cl.
CPC ............ *H04L 63/068* (2013.01); *H04L 9/0833* (2013.01); *H04L 9/0891* (2013.01); *H04L 63/062* (2013.01); *H04L 63/065* (2013.01); *H04L 63/10* (2013.01)

(58) Field of Classification Search
CPC ..... H04L 9/0833; H04L 9/0891; H04L 63/10; H04L 63/065; H04L 63/062; H04L 63/068
See application file for complete search history.

(56) References Cited

U.S. PATENT DOCUMENTS

| 5,404,404 | A  | * | 4/1995 | Novorita | 380/271 |
|---|---|---|---|---|---|
| 7,065,643 | B1 | * | 6/2006 | Cornils et al. | 713/163 |
| 8,634,560 | B1 | * | 1/2014 | Ng | H04L 9/0822 380/273 |
| 2006/0233371 | A1 | * | 10/2006 | Sowa et al. | 380/248 |
| 2007/0076886 | A1 | * | 4/2007 | Hori | H04L 63/068 380/277 |
| 2007/0253554 | A1 |   | 11/2007 | Chesson et al. | |
| 2008/0130902 | A1 | * | 6/2008 | Foo Kune et al. | 380/286 |
| 2009/0092252 | A1 | * | 4/2009 | Noll | H04L 9/083 380/277 |
| 2009/0147951 | A1 | * | 6/2009 | Kuo | H04W 12/04 380/44 |
| 2011/0135097 | A1 | * | 6/2011 | Redfern et al. | 380/279 |
| 2011/0150223 | A1 | * | 6/2011 | Qi et al. | 380/273 |
| 2013/0054964 | A1 | * | 2/2013 | Messerges | H04L 9/0833 713/163 |

* cited by examiner

*Primary Examiner* — Michael Pyzocha
(74) *Attorney, Agent, or Firm* — Birch, Stewart, Kolasch & Birch, LLP

(57) ABSTRACT

A method is provided for security key renewal performed in a key management device of a communication system. The communication system includes two or more communication devices communicating data packets by using a first security key for transmission and reception. The method includes transmitting, to the two or more communication devices, a second security key for transmission and reception of the data packets; transmitting, to the two or more communication devices, an activation message for activating use of the second security key for reception of the data packets; transmitting, to the two or more communication devices, an activation message for activating use of the second security key for transmission of the data packets; transmitting, to the two or more communication devices; a deactivation message for deactivating use of the first security key for transmission of the data packets; and transmitting, to the two or more communication devices, a deactivation message for deactivating use of the first security key for reception of the data packets.

20 Claims, 4 Drawing Sheets

METHODS AND DEVICES FOR SECURITY KEY RENEWAL IN A COMMUNICATION SYSTEM

TECHNICAL FIELD

The technology disclosed herein relates generally to the field of communication systems, and in particular to security key renewal methods within such communication systems.

BACKGROUND

Real-time communication systems rely on a well-functioning communication channel between two communicating devices that are part of the communication system. The communication channel is typically imposed with strict requirements in different regards, for example in view of determinism, latency, jitter and loss of data packets. Another aspect is security of the communication and an applied security layer may slightly delay the communication, but should not interrupt the communication channel or cause loss of data packets. Keys used for securing the communication channel, e.g. for authentication and encryption of data packets, typically need to be renewed on a regular basis in order to keep the security on a required level. In many communication systems the same key is used for a group of devices and a dedicated key server distributes the keys and enables the use of the keys in the devices.

A difficulty during a key renewal process is that all devices of the communication system using the same key should renew their keys simultaneously in order not to risk data packets to be invalidated in the receiving device due to use of expired keys. This problem is particularly pronounced in communication systems involving a large number of devices and even further so when the distance between the devices is large. For example, in communication between substations of an electric power transmission system the communicating devices may be distributed widely apart and may use different key servers or key groups. In such communication system it may not be sufficient to renew the key simultaneously, since there may be data packets travelling in the system which have not yet reached their destination, and could be invalidated upon arrival by being encrypted with an old key and received with a renewed key.

SUMMARY

An object of the present disclosure is to overcome or at least alleviate one or more of the above mentioned problems.

The object is, according to a first aspect, achieved by a method for security key renewal performed in a key management device of a communication system. The communication system comprises two or more communication devices communicating data packets by using a first security key for transmission and reception. The method comprises: transmitting, to the two or more communication devices, a second security key for transmission and reception of the data packets; transmitting, to the two or more communication devices, an activation message for activating use of the second security key for reception of the data packets; transmitting, to the two or more communication devices, an activation message for activating use of the second security key for transmission of the data packets; transmitting, to the two or more communication devices, a deactivation message for deactivating use of the first security key for transmission of the data packets; and transmitting, to the two or more communication devices, a deactivation message for deactivating use of the first security key for reception of the data packets.

By means of the method, an improved security key renewal is provided in that it is ensured that all communication devices of the communication system have started using the second security key, i.e. the new, security key, before the use of the first security key, i.e. the old security key, is revoked. The use of two (or more) different security keys simultaneously is supported and no data packets are lost due to invalidation of the data packet at reception.

The object is, according to a second aspect, achieved by a key management device in a communication system for security key renewal. The communication system comprises two or more communication devices communicating data packets by using a first security key for transmission and reception of the data packets. The key management device comprises a processing unit configured to: transmit, to the two or more communication devices, a second security key for reception and transmission of the data packets; transmit, to the two or more communication devices, an activation message for activating use of the second security key for reception of the data packets; transmitting, to the two or more communication devices, an activation message for activating use of the second security key for transmission of the data packets; transmit, to the two or more communication devices, a deactivation message for deactivating use of the first security key for transmission of the data packets; and transmit, to the two or more communication devices, a deactivation message for deactivating use of the first security key for reception of the data packets.

The object is, according to a third aspect, achieved by a method for security key renewal performed in a communication device of a communication system. The communication device communicates data packets by using a first security key for reception and transmission of the data packets. The communication system comprises a key management device. The method comprises: receiving, from the key management device, a second security key for reception and transmission of data packets; activating use of the second security key for reception of the data packets, and committing in response thereto to use of the second security key for reception of data packets; activating use of the second security key for transmission of the data packets, and committing in response thereto to the use of the second security key for transmission of data packets; deactivating use of the first security key for transmission of the data packets, and revoking in response thereto the use of the first security key for transmission; and deactivating use of the first security key for reception of the data packets, and revoking in response thereto the use of the first security key for reception.

The object is, according to a fourth aspect, achieved by a communication device of a communication system for security key renewal. The communication device communicates data packets by using a first security key for transmission and reception of the data packets. The communication system comprises a key management device and the communication device comprises a processing unit configured to: receive, from the key management device, a second security key for reception and transmission of data packets; activate use of the second security key for reception of the data packets, and committing in response thereto to use of the second security key for reception of data packets; activate use of the second security key for transmission of the data packets, and committing in response thereto to the use of the second security key for transmission of data packets; deactivate use of the first security key for transmission of the data packets, and revoking in response thereto the use of the first security key for transmission, and deactivate use of the first security key for reception of the data packets, and revoking in response thereto the use of the first security key for reception.

Further features and advantages of the present disclosure will become clear upon reading the following description and the accompanying drawings.

DETAILED DESCRIPTION OF EMBODIMENTS

Figure 1:
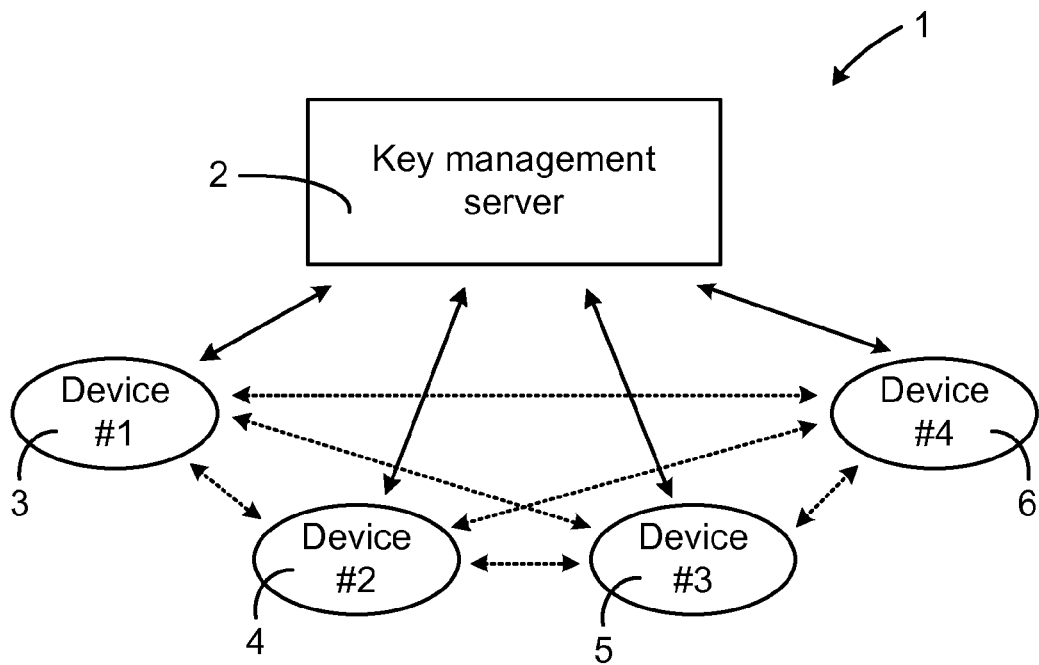
FIG. 1 illustrates schematically a general environment in which embodiments of the present disclosure may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

FIG. 1 illustrates schematically a general environment in which embodiments of the present disclosure may be implemented. A communication system 1 is illustrated comprising a key management device 2, which may be a server, i.e. computer hardware, or a processing unit such as a central processing unit (CPU). The key management device 2 may be a dedicated server configured to distribute and manage security aspects within the communication system 1, for example transmitting renewed security keys to devices within the communication system 1 that need to exchange information in a secured way.

The communication system 1 further comprises a number of communication devices 3, 4, 5, 6, which for example may comprise controller device, process controller, Intelligent Electronic Device (IED), Human-Machine interface (HMI), a server, an input/output (I/O) unit, a gateway, a communication gateway, a programmable logic controller (PLC), motion controller etc. The communication devices 3, 4, 5, 6 are configured to communicate with each other over communication links and are provided with devices for this end, such as for example communication interfaces. Such communication links are illustrated by the dashed lines in the figure. A first communication device 3 is thus able to receive information from and transmit information to all or some of the other communication devices 4, 5, 6. In an embodiment, each communication device is configured for communication with all other communication devices. The communication links may comprise wired connections such as for example optical fiber cables or Ethernet or wireless communication links.

The key management device 2 is able to communicate with each of the communication devices 3, 4, 5, 6, which communication is illustrated by the unbroken arrows. The communication may be a two-way communication and the key management device 2 is thus able to receive information, e.g. in the form of data packets, from and transmit information to the communication devices 3, 4, 5, 6.

In order to fulfill security requirements the communication between the communication devices 3, 4, 5, 6 may need to be secured in some way, e.g. be encrypted or signed e.g. using a Message Authentication Code (MAC), and a receiving communication device 3, 4, 5, 6 may be required to authenticate that a received data packet is indeed received from an approved or legitimate sender. It may be difficult to coordinate a renewal process within the communication system 1, so that all communication devices 3, 4, 5, 6 receive updated security keys simultaneously and start using them at the same time, without loosing any data packets.

Briefly, in an aspect of the present disclosure, the communication devices 3, 4, 5, 6 are provided with means for handling two or more security keys. Thereby the presently used security key as well as a renewed security key may be used for receiving data packets. Irrespective of whether a sending communication device uses the renewed security key or the "old" (i.e. presently used) security key, the receiving communication device is able to correctly authenticate and/or decrypt the data packet. The renewal process is thereby rendered bumpless, i.e. during the security key renewal there are no data packets lost due to invalidations in the receiving communication device; for example invalidations due to a data packet being sent with one security key and received with another, not matching, security key.

Figure 2:
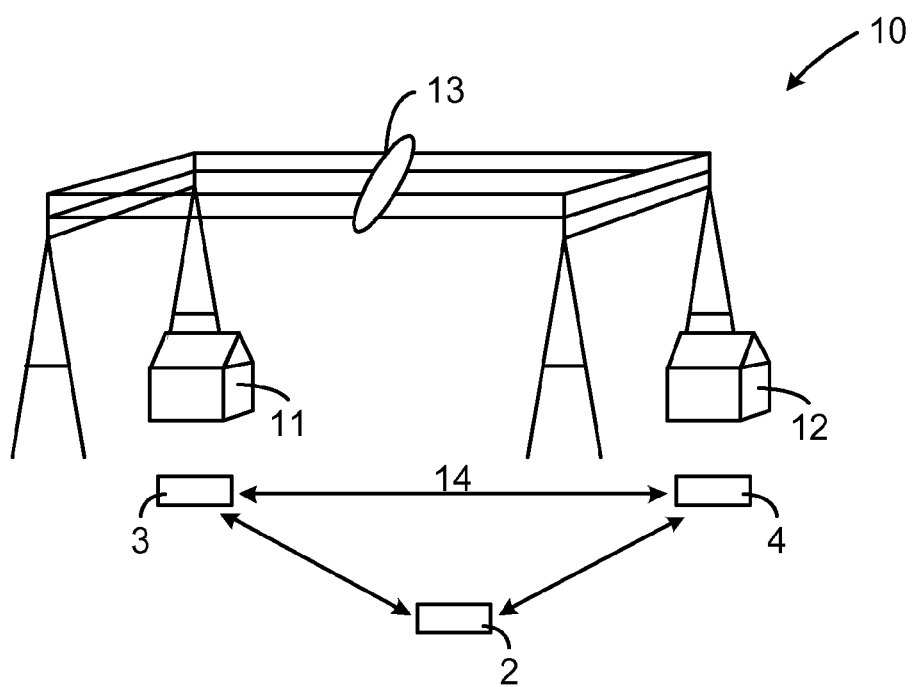
FIG. 2 illustrates an exemplifying environment in which embodiments of the present disclosure may be implemented.

FIG. 2 illustrates an exemplifying environment in which embodiments of the present disclosure may be implemented. Aspects of the present disclosure may be implemented in various environments using the communication system 1 for communication between devices.

Examples of such environments comprise control and automation systems, industrial systems and electrical power systems. FIG. 2 illustrates one particular application field, and specifically an electrical power system 10. The electrical power system 10 comprises a number of substations 11, 12 (two illustrated), which generally are part of an electrical generation, transmission, and distribution system. The substations 11, 12 may for example comprise transmission substations connecting a number of transmission lines 13.

Each substation 11, 12 utilize a communication system, such as the one described with reference to FIG. 1. That is, each substation 11, 12 comprises a respective communication device 3, 4, which are configured to communicate with each other over a communication link 14 (compare with the hatched lines between the communication devices 3, 4, 5, 6 of FIG. 1). The first substation 11 thus comprises a first communication device 3 and the second substation 12 comprises a second communication device 4.

In such scenario, the first substation 11 and the second substation 12 need to exchange information, for example measured current values, e.g. for use in fault detection and/or protection algorithms that typically compare input current values and output current values to detect faults e.g. in the transmission lines. The first communication device 3 and the second communication device 4 therefore need to communicate real-time information. This information may further need to be secured in some way, for example by using security keys. The first communication device 3 sends a secured data packet (e.g. encrypted or signed) to the second communication device 4, which authenticates the data packet ensuring that the sending party is indeed the first communication device 3.

As mentioned earlier, it is often necessary to renew the security keys in order to maintain a desired and/or required security level. For this end, a key management device 2 is provided, for example a key management device 2 as described in relation to FIG. 1. The key management device 2 is configured to communicate with the first and second communication devices 3, 4 and may to each of them send a renewed security key. In the exemplifying scenario, it is crucial that the data packets are received, even during the key renewal process, in order not to risk interruptions in e.g. the fault detection algorithms.

The key management device 2 (refer to FIGS. 1 and 2) is configured to distribute a new security key, or a pair of security keys comprising a security key for transmission and a security key for reception, to the communication devices 3, 4, 5, 6 e.g. by sending a message comprising the new key.

The new security key is received by the communication devices 3, 4, 5, 6 which send an acknowledgment in return to the key management device 2.

Upon receiving the acknowledgements, the key management device 2 sends an activation message to the communication devices 3, 4, 5, 6 that the new security key should be used for reception. By awaiting the acknowledgments, i.e. confirmation that all communication devices 3, 4, 5, 6 have received the new security key before committing the use thereof, it is ensured that no communication device operates solely using the old security key.

Thereafter, the key management device 2 sends an activation message to the communication devices 3, 4, 5, 6 informing that the new security key should be used for transmission of data packets.

Next, the key management device 2 sends a revocation message to the communication devices 3, 4, 5, 6 informing that the old security key for transmission of data packets should not be used anymore.

It is noted that the message for committing to use the new security key for transmission of data packets and the revocation message for stop using the old security key for transmission of data packets may be combined. It may for example be implicit for the communication device 3, 4, 5, 6 that upon activating use of a new security key, the use of an old one should be revoked.

The key management device 2 may then await until all communication devices 3, 4, 5, 6 have acknowledged the revoked use of the old security key for transmission of data packets, e.g. by receiving from each communication device an acknowledgement message to this end. In another embodiment, the key management device 2 awaits a predetermined period of time, and after elapse of this period of time it assumes that all communication devices 3, 4, 5, 6 have stopped using the old security key for transmission.

Next, the key management device 2 sends a message commanding the communication devices 3, 4, 5, 6 that the use of the old security key for reception of data packets is revoked.

By enabling the communication devices 3, 4, 5, 6 to handle multiple security keys, there is no need to rely on synchronized clocks or the like for determining when a renewed security key is to be taken into use and the old one is to be revoked. The use of clocks may run the risk that some data packets are invalidated, particularly if the communication devices 3, 4, 5, 6 are widely spaced apart, e.g. located in different substations or industrial plants.

The above key renewal process in the key management device 2 can be summarized as:

1. Distribute new security key
2. Await acknowledgements
3. Commit use of new security key for reception
4. Commit use of new security key for transmission
5. Revoke use of old security key for transmission, wait
6. Revoke use of old security key for reception From the communication device 2 perspective the security key renewal process is as follows. The communication device 3, 4, 5, 6 receives the new security key and acknowledges the reception thereof.

Then in response to the activation message from the key management device 2 that the new security key should be used for reception of data packets it accepts and commits to the use of this new security key for reception of data packets.

Next, in response to the activation message from the key management device 2 that the new security key should be used for transmission of data packets it accepts and commits to the use of this new security key for transmission of data packets.

Next, in response to the revocation message from the key management device 2 informing that the old security key for transmission of data packets should not be used anymore, the communication device 3, 4, 5, 6 revokes the use of the old key for transmission of data packets.

The communication device 3, 4, 5, 6 sends an acknowledgement to the key management device 2 confirming the revoked use of the old security key for transmission of data packets.

Next, in response to the revocation message from the key management device 2; 12 informing that the old security key for reception of data packets should not be used anymore, the communication device 3, 4, 5, 6 revokes the use of the old key for reception of data packets.

The above key renewal process in the communication device 3, 4, 5, 6 can be summarized as:

1. Receive new security key
2. Accept use of new security key for reception
3. Accept use of new security key for transmission
4. Revoke use of old security key for transmission
5. Revoke use of old security key for reception The communication devices 3, 4, 5, 6 are thus, during a transition time between use of the old, i.e. presently used, security key and use of the renewed security key, enabled to use both the old security key and the renewed security key. In particular, from the accepted use of the new key (step 2 above) until the revoked use of old key for reception of data packets (step 5 above), the communication device is able to use both security keys in receiving data packets.

Figure 3:
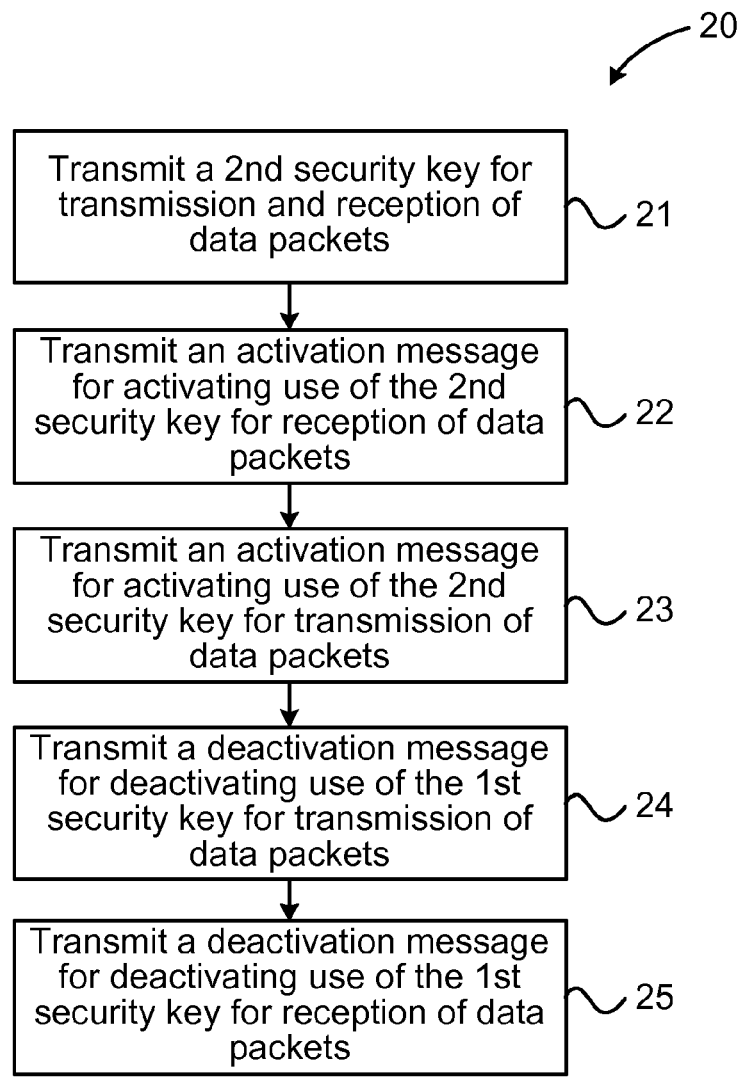
FIG. 3 is a flow chart of a method performed in a key management device.

FIG. 3 is a flow chart of a method for security key renewal performed in a key management device 2 of a communication system 1, such as the one described with reference to FIG. 1. The communication system 1 comprises two or more communication devices 3, 4, 5, 6 communicating data packets by using a first security key for transmission and reception. The first security key is a presently used security key ("old" security key), which is to be replaced by a new security key.

The method 20 comprises transmitting 21, to the two or more communication devices 3, 4, 5, 6, a second security key for transmission and reception of the data packets. The second security key is intended to replace the first security key, thereby renewing the security key that is used and thereby fulfilling security requirements.

The method 20 comprises transmitting 22, to the two or more communication devices 3, 4, 5, 6, an activation message for activating the use of the second security key for reception of the data packets.

The method 20 comprises transmitting 23, to the two or more communication devices 3, 4, 5, 6, an activation message for activating the use of the second security key for transmission of the data packets.

The method 20 comprises transmitting 24, to the two or more communication devices 3, 4, 5, 6, a deactivation message for deactivating the use of the first security key for transmission of the data packets.

The method 20 comprises transmitting 25, to the two or more communication devices 3, 4, 5, 6, a deactivation message for deactivating use of the first security key for reception of the data packets.

The method 20 may be performed regularly for updating the security key that is used and thereby maintaining a desired security level.

In an embodiment, the method 20 comprises awaiting acknowledgments from the two or more communication devices 3, 4, 5, 6 confirming reception of the second security key before transmitting 22, 23 the activation message for activating use of the second security key for reception of the data packets.

In an embodiment, the method 20 comprises awaiting acknowledgments from the two or more communication devices 3, 4, 5, 6 confirming the revoked use of the first security key for transmission of data packets, before transmitting 25 the deactivation message for deactivating use of the first security key for reception of the data packets.

In an embodiment, the method 20 comprises the transmitting 23 of an activation message for activating use of the second security key for transmission of the data packets and transmitting 24 a deactivation message for deactivating use of the first security key for transmission of the data packets, is performed in a single message.

In variations of the above embodiments of the method 20, the first security key comprises a first pair of security keys comprising a presently used security key for reception and a presently used security key for transmission of the data packets.

In further variations of the above embodiments of the method 20, the second security key comprises a second pair of security keys comprising a renewed security key for reception and a renewed security key for transmission of the data packets.

Figure 4:
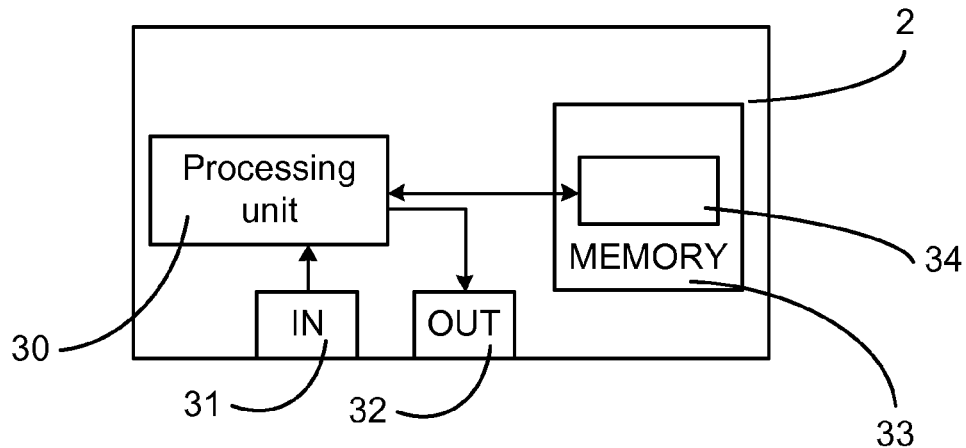
FIG. 4 illustrates schematically a key management device comprising means for implementing embodiments of the methods.

FIG. 4 illustrates schematically a key management device 2 comprising means for implementing embodiments of the methods.

The key management device 2 comprises an input device 31 for receiving data packets and an output device 32 for transmitting data packets. The input and output devices 31, 32 may comprise an interface unit comprising hardware and/or software for data communication using a communication protocol.

The key management device 2 further comprises a processing unit 30, e.g. a central processing unit, microcontroller, digital signal processor (DSP), application specific integrated circuit (ASIC) or field programmable gate array (FPGA) etc., capable of executing software instructions stored in a computer program product 33 e.g. in the form of a memory. The processor 30 is connected to the input device 31 for reception of data packets and to the output device 32 for outputting data packets.

The described methods and algorithms or parts thereof for use in renewing security keys may be implemented by software and/or hardware in the processor 30, e.g. by application specific integrated circuit (ASIC) or field programmable gate array (FPGA) or any combination of software and hardware.

To this end, the key management device 2 may further comprise a computer program 34 stored on the computer program product 33.

In an embodiment the key management device 2, and in particular the processing unit 30 thereof, is configured to:
transmit, to the two or more communication devices 3, 4, 5, 6, a second security key for reception and transmission of the data packets,
transmit, to the two or more communication devices 3, 4, 5, 6, an activation message for activating use of the second security key for reception of the data packets,
transmitting 23, to the two or more communication devices 3, 4, 5, 6, an activation message for activating use of the second security key for transmission of the data packets,
transmit, to the two or more communication devices 3, 4, 5, 6, a deactivation message for deactivating use of the first security key for transmission of the data packets, and
transmit, to the two or more communication devices 3, 4, 5, 6, a deactivation message for deactivating use of the first security key for reception of the data packets.

With reference still to FIG. 4, the present disclosure also encompasses the computer program 34 for the key management device 2. The computer program 34 comprises computer program code, which, when run on the processing unit 30 of the key management device 2, causes the key management device 2 to perform the steps as described above for the processing unit.

A computer program product 32 is also provided comprising a computer program 34 as described above, and computer readable means on which the computer program 34 is stored. The computer program product 32 may be any combination of read and write memory (RAM) or read only memory (ROM). The computer program product 33 may also comprise persistent storage, which, for example can be any single one or combination of magnetic memory, optical memory, or solid state memory.

Figure 5:
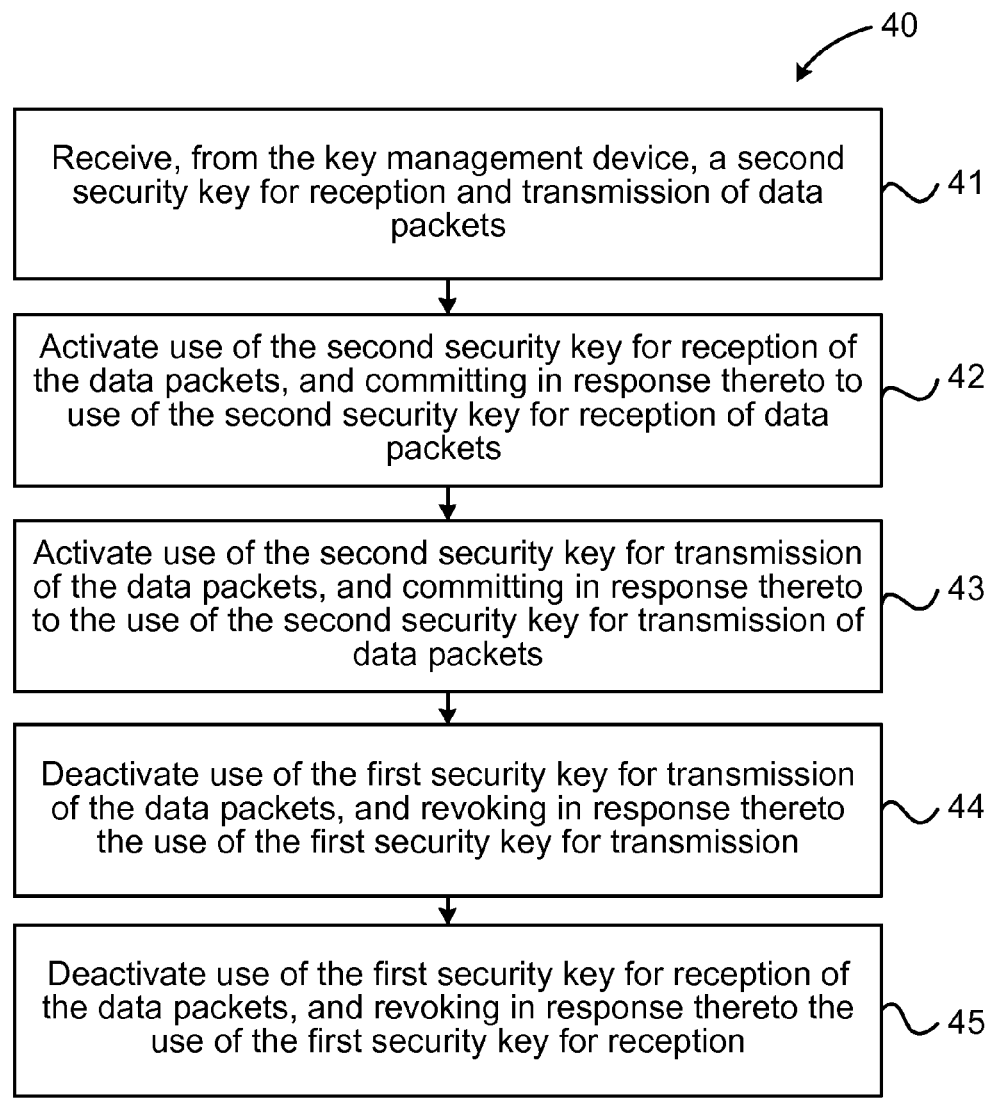
FIG. 5 is a flow chart of a method performed in a communication device.

FIG. 5 is a flow chart of a method for security key renewal performed in a communication device 3, 4, 5, 6 of a communication system 1, such as the communication system described with reference to FIG. 1. The communication device 3, 4, 5, 6 is configured to communicate data packets by using a first security key for reception and transmission of the data packets, and the communication system 1 comprises a key management device 2. The method 40 comprises receiving 41, from the key management device 2, a second security key for reception and transmission of data packets. The communication device 3, 4, 5, 6 then has two different security keys for reception and transmission of data packets. However, the second security key is not yet taken into use.

The method 40 comprises activating 42 use of the second security key for reception of the data packets, and committing in response thereto to use of the second security key for reception of data packets. The communication device 3, 4, 5, 6 is now able to receive data packets using the first or the second security key, both of which are valid for reception of data packets.

In one embodiment, the activating 42 use of the second security key for reception comprises receiving 42, from the key management device 2, an activation message for activating use of the second security key for reception of the data packets, and committing in response thereto to use of the second security key for reception of data packets. The communication device 3, 4, 5, 6 is now able to receive data packets using the first or the second security key, both of which are valid for reception of data packets. In another embodiment, the activation is performed by the communication device 3, 4, 5, 6 upon expiry of a selected time period after the reception of the key.

The method 40 comprises activating 43 use of the second security key for transmission of the data packets, and committing in response thereto to the use of the second security key for transmission of data packets. The communication device 3, 4, 5, 6 is now able to also transmit data packets using the first or the second security key, both of which are valid for transmission of data packets.

In one embodiment, the activating 43 use of the second security key for transmission comprises receiving, from the key management device 2, an activation message for activating use of the second security key for transmission of the data packets, and committing in response thereto to the use of the second security key for transmission of data packets. In another embodiment, the activation is performed by the communication device 3, 4, 5, 6 upon expiry of a selected time period after the reception of the key.

The method 40 comprises deactivating 44 use of the first security key for transmission of the data packets, and revoking in response thereto the use of the first security key for transmission. The communication device 3, 4, 5, 6 no longer transmits using the first ("old") security key, but only the second ("new") security key. The communication device 3, 4, 5, 6 may thus receive with either the first or second security key, but data packets are no longer transmitted in the communication system 1 using the first security key.

In an embodiment, the deactivating 44 use of the first security key for transmission comprises receiving, from the key management device 2, a deactivation message for deactivating use of the first security key for transmission of the data packets, and revoking in response thereto the use of the first security key for transmission. In another embodiment, the deactivation is performed by the communication device 3, 4, 5, 6 upon expiry of a selected time period after the reception of the key.

The method 40 comprises deactivating 45 use of the first security key for reception of the data packets, and revoking in response thereto the use of the first security key for reception. The communication device 3, 4, 5, 6 is no longer able to transmit or receive using the first ("old") security key, but only the second ("new") security key.

In an embodiment, the deactivating 45 comprises receiving, from the key management device 2, a deactivation message for deactivating use of the first security key for reception of the data packets, and revoking in response thereto the use of the first security key for reception.

In an embodiment, the method 40 comprises transmitting, to the key management device 2, an acknowledgment confirming reception of the second security key in response to receiving 42, 43 the second security key.

In an embodiment, the method 40 comprises transmitting, to the key management device 2, an acknowledgment confirming the revoked use of the first security key for transmission of data packets in response to receiving the deactivation message for deactivating use of the first security key for transmission of data packets.

In an embodiment, the receiving 43 of an activation message for activation of the second security key for transmission of the data packets and receiving 44 a deactivation message for deactivation of the first security key for transmission of the data packets, is received as a single message.

Figure 6:
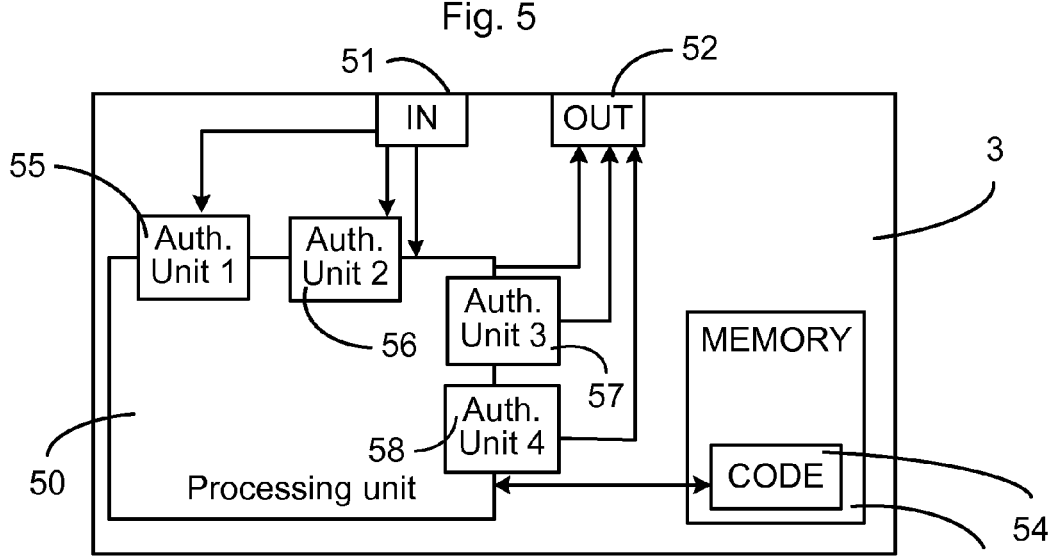
FIG. 6 illustrates schematically a communication device comprising means for implementing embodiments of the methods.

FIG. 6 illustrates schematically a communication device comprising means for implementing embodiments of the methods. The communication device 3, 4, 5, 6 comprises an input device 51 for receiving data packets and an output device 52 for transmitting data packets. The input and output devices 51, 52 may comprise an interface unit comprising hardware and/or software for data communication using a communication protocol.

The communication device 3, 4, 5, 6 comprises a processing unit 50, e.g. a central processing unit (CPU), microcontroller, digital signal processor (DSP), application specific integrated circuit (ASIC) or field programmable gate array (FPGA), combinations of FPGAs and CPUs etc., capable of executing software instructions stored in a computer program product 53 e.g. in the form of a memory. The processor 34 is connected to the input device 51 for receiving data packets therefrom and to the output device 52 for outputting data packets.

The communication device 3, 4, 5, 6 is provided with means 55, 56, 57, 58 for handling two or more security keys, which security keys may be valid simultaneously. This means may for example comprise hardware, such as application specific integrated circuit (ASIC) and/or field programmable gate array (FPGA), software or combinations thereof. A hardware solution is preferred in many cases, since the delay in reception of data packets and processing thereof is often shorter compared to e.g. a software solution.

In an embodiment the authentication means 55, 56, 57, 58 comprises two authentication devices 55, 56 each handling a respective security key for reception and two authentication devices 57, 58 each handling a respective security key for transmission. The authentication devices 55, 56 for reception may thus operate in parallel. Likewise, the authentication devices 57, 58 for transmission may also operate in parallel. The authentication can thus be performed in parallel, which provides a faster authentication. The authentication means 55, 56, 57, 58 may be part of the processing unit 50 or be separate units connected to the processing unit 50.

Figure 7:
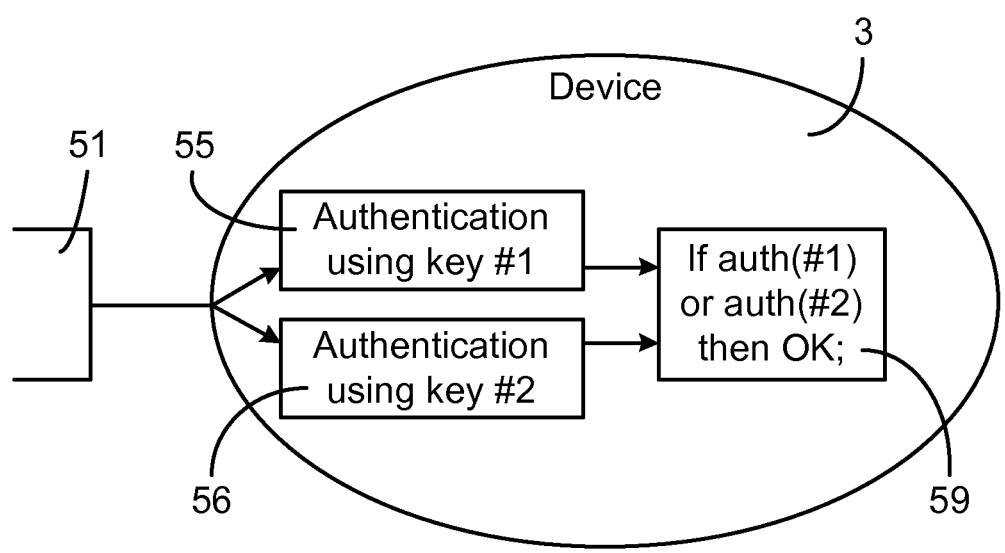
FIG. 7 illustrates exemplifying authentication means in a communication device.

FIG. 7 illustrates the authentication means 55, 56 for reception in form of authentication logic. In particular, the input device 51 feeds a data packet to a first authentication device 55 and to a second authentication device 56. The first and second authentication devices 55, 56 tries to authenticate the data packet using a first and a second security key, respectively. If, as indicated at reference numeral 59, the first authentication device 55 is able to authenticate the data packet using its security key, or if the second authentication device 56 is able to authenticate the data packet using its security key, then the data packet is authenticated. Such logic may, as mentioned earlier, be implemented using hardware or software.

It is noted that although only two authentication devices 55, 56 are illustrated, the communication device 3, 4, 5, 6 may comprise yet additional authentication devices, enabling still further security keys to be valid simultaneously. For example, if three authentication devices are provided, three security keys could be valid during a transition time. Upon termination of the transition time, one or two of them could be revoked, leaving one or two security keys to be valid for transmission and reception. The key management device 2 may thus enable/disable any number of security keys. The corresponding configuration may be implemented also for the authentication means 57, 58 for transmission.

In another embodiment (not illustrated in the figure) the authentication means comprises a single authentication device, e.g. a single integrated circuit, configured to authenticate two or more different security keys. The authentication processing is then sequential, which may result in a slightly delayed authentication of data packets compared to the use of parallel processing.

With reference again to FIG. 6, the described methods and algorithms or parts thereof for use in renewing security keys may be implemented by software and/or hardware in the processor 50. To this end, the communication device 3, 4, 5, 6 may further comprise the computer program 54 stored on the computer program product 53.

In an embodiment the communication device 3, 4, 5, 6, and in particular the processing unit 50 thereof, is configured to:
  receive, from the key management device 2, a second security key for reception and transmission of data packets,
  activate use of the second security key for reception of the data packets, and committing in response thereto to use of the second security key for reception of data packets,
  activate use of the second security key for transmission of the data packets, and committing in response thereto to the use of the second security key for transmission of data packets,
  deactivate use of the first security key for transmission of the data packets, and revoking in response thereto the use of the first security key for transmission, and
  deactivate use of the first security key for reception of the data packets, and revoking in response thereto the use of the first security key for reception.

In another embodiment the communication device 3, 4, 5, 6, and in particular the processing unit 50 thereof, is configured to:
  receive, from the key management device 2, a second security key for reception and transmission of the data packets,
  receive, from the key management device 2, an activation message for activating use of the second security key for reception of the data packets, and committing in response thereto to use of the second security key for reception of data packets,
  receive, from the key management device 2, an activation message for activating use of the second security key for transmission of the data packets, and committing in response thereto to the use of the second security key for transmission of data packets,
  receive, from the key management device 2, a deactivation message for deactivating use of the first security key for transmission of the data packets, and revoking in response thereto the use of the first security key for transmission, and
  receive, from the key management device 2, a deactivation message for deactivating use of the first security key for reception of the data packets, and revoking in response thereto the use of the first security key for reception.

In an embodiment, the communication device 3, 4, 5, 6 comprises means, e.g. the authentication devices 55, 56, configured to handle a respective security key for reception.

In an embodiment, the communication device 3, 4, 5, 6 comprises means, e.g. the authentication devices means 57, 58, configured to handle a respective security key for transmission.

With reference again to FIG. 6, the present disclosure also encompasses the computer program 54 for the communication device 3, 4, 5, 6. The computer program 54 comprises computer program code, which, when run on the processing unit 50 of the communication device 3, 4, 5, 6 causes the communication device 3, 4, 5, 6 to perform the steps as described above for the processing unit 50.

A computer program product 53 is also provided comprising a computer program 54 as described above, and computer readable means on which the computer program 54 is stored. The computer program product 53 may be any combination of read and write memory (RAM) or read only memory (ROM). The computer program product 53 may also comprise persistent storage, which, for example can be any single one or combination of magnetic memory, optical memory, or solid state memory.

It is noted that the first security key may comprise a pair of security keys comprising a presently used security key for reception and a presently used security key for transmission of the data packets. Likewise, the second security key may, in an embodiment, comprise a pair of security keys comprising a renewed security key for reception and a renewed security key for transmission of the data packets.

The invention claimed is:

1. A method for security key renewal performed in a key management device of a communication system, the communication system comprising two or more communication devices communicating data packets by using a first security key for transmission and reception, the method comprising:
  transmitting, to the two or more communication devices, a second security key for transmission and reception of the data packets;
  after transmitting, to the two or more communication devices, the second security key for transmission and reception of the data packets, transmitting, to the two or more communication devices, an activation message for activating use of the second security key for reception of the data packets;
  after transmitting, to the two or more communication devices, the activation message for activating use of the second security key for reception of the data packets, transmitting, to the two or more communication devices, an activation message for activating use of the second security key for transmission of the data packets;
  transmitting, to the two or more communication devices, a deactivation message for deactivating use of the first security key for transmission of the data packets; and
  transmitting, to the two or more communication devices, a deactivation message for deactivating use of the first security key for reception of the data packets.

2. The method as claimed in claim 1, wherein the first security key comprises a first pair of security keys comprising a presently used security key for reception and a presently used security key for transmission of the data packets.

3. The method as claimed in claim 2, wherein the second security key comprises a second pair of security keys comprising a renewed security key for reception and a renewed security key for transmission of the data packets.

4. The method as claimed in claim 2, comprising awaiting acknowledgments from the two or more communication devices confirming the revoked use of the first security key for transmission of data packets, before transmitting the deactivation message for deactivating use of the first security key for reception of the data packets.

5. The method as claimed in claim 2, wherein the transmitting of an activation message for activating use of the second security key for transmission of the data packets and transmitting a deactivation message for deactivating use of the first security key for transmission of the data packets, is performed in a single message.

6. The method as claimed in claim 1, wherein the second security key comprises a second pair of security keys comprising a renewed security key for reception and a renewed security key for transmission of the data packets.

7. The method as claimed in claim 6, wherein the transmitting of an activation message for activating use of the second security key for transmission of the data packets and transmitting a deactivation message for deactivating use of the first security key for transmission of the data packets, is performed in a single message.

8. The method as claimed in claim 1, comprising awaiting acknowledgments from the two or more communication devices confirming reception of the second security key before transmitting the activation message for activating use of the second security key for reception of the data packets.

9. The method as claimed in claim 8, wherein the transmitting of an activation message for activating use of the second security key for transmission of the data packets and transmitting a deactivation message for deactivating use of the first security key for transmission of the data packets, is performed in a single message.

10. The method as claimed in claim 1, comprising awaiting acknowledgments from the two or more communication devices confirming the revoked use of the first security key for transmission of data packets, before transmitting the deactivation message for deactivating use of the first security key for reception of the data packets.

11. The method as claimed in claim 1, wherein the transmitting of an activation message for activating use of the second security key for transmission of the data packets and transmitting a deactivation message for deactivating use of the first security key for transmission of the data packets, is performed in a single message.

12. A key management device in a communication system for security key renewal, the communication system comprising two or more communication devices communicating data packets by using a first security key for transmission and reception of the data packets, the key management device comprising a processor coupled to a memory configured to:
   transmit, to the two or more communication devices, a second security key for reception and transmission of the data packets;
   after transmitting, to the two or more communication devices, the second security key for transmission and reception of the data packets, transmit, to the two or more communication devices, an activation message for activating use of the second security key for reception of the data packets;
   after transmitting, to the two or more communication devices, the activation message for activating use of the second security key for reception of the data packets, transmit, to the two or more communication devices, an activation message for activating use of the second security key for transmission of the data packets;
   transmit, to the two or more communication devices, a deactivation message for deactivating use of the first security key for transmission of the data packets; and
   transmit, to the two or more communication devices, a deactivation message for deactivating use of the first security key for reception of the data packets.

13. A method for security key renewal performed in a communication device of a communication system, the communication device communicating data packets by using a first security key for reception and transmission of the data packets, the communication system comprising a key management device, the method comprising:
   receiving, from the key management device, a second security key for reception and transmission of data packets;
   after receiving, from the key management device, the second security key for reception and transmission of data packets, activating use of the second security key for reception of the data packets, and committing in response thereto to use of the second security key for reception of data packets;
   after activating use of the second security key for reception of the data packets, and committing in response thereto to use of the second security key for reception of data packets, activating use of the second security key for transmission of the data packets, and committing in response thereto to the use of the second security key for transmission of data packets;
   deactivating use of the first security key for transmission of the data packets, and revoking in response thereto the use of the first security key for transmission; and
   deactivating use of the first security key for reception of the data packets, and revoking in response thereto the use of the first security key for reception.

14. The method as claimed in claim 13, wherein the activating use of the second security key for reception comprises receiving, from the key management device, an activation message for activating use of the second security key for reception of the data packets, and committing in response thereto to use of the second security key for reception of data packets.

15. The method as claimed in claim 13, wherein the activating use of the second security key for transmission comprises receiving, from the key management device, an activation message for activating use of the second security key for transmission of the data packets, and committing in response thereto to the use of the second security key for transmission of data packets.

16. The method as claimed in claim 13, wherein the deactivating use of the first security key for transmission comprises receiving, from the key management device, a deactivation message for deactivating use of the first security key for transmission of the data packets, and revoking in response thereto the use of the first security key for transmission.

17. The method as claimed in claim 13, wherein the deactivating use of the first security key for reception comprises receiving, from the key management device, a deactivation message for deactivating use of the first security key for reception of the data packets, and revoking in response thereto the use of the first security key for reception.

18. A communication device of a communication system for security key renewal, the communication device communicating data packets by using a first security key for transmission and reception of the data packets, the communication system comprising a key management device, the communication device comprising a processor coupled to a memory configured to:
   receive, from the key management device, a second security key for reception and transmission of data packets;
   after receiving, from the key management device, the second security key for reception and transmission of data packets, activate use of the second security key for reception of the data packets, and committing in response thereto to use of the second security key for reception of data packets;
   after activating use of the second security key for reception of the data packets, and committing in response thereto to use of the second security key for reception of data packets, activate use of the second security key for transmission of the data packets, and committing in response thereto to the use of the second security key for transmission of data packets;
   deactivate use of the first security key for transmission of the data packets, and revoking in response thereto the use of the first security key for transmission; and deactivate use of the first security key for reception of the data packets, and revoking in response thereto the use of the first security key for reception.

19. The communication device as claimed in claim 18, comprising means configured to handle a respective security key for reception.

20. The communication device as claimed in claim 18, comprising means configured to handle a respective security key for transmission.

* * * * *